US011502934B2

(12) United States Patent
Zheng et al.

(10) Patent No.: US 11,502,934 B2
(45) Date of Patent: Nov. 15, 2022

(54) EZ-PASS: AN ENERGY PERFORMANCE-EFFICIENT POWER-GATING ROUTER ARCHITECTURE FOR SCALABLE ON-CHIP INTERCONNECT ARCHITECTURE

(71) Applicant: The George Washington University, Washington, DC (US)

(72) Inventors: Hao Zheng, Arlington, VA (US); Ahmed Louri, Vienna, VA (US)

(73) Assignee: The George Washington Univesity, Washington, DC (US)

( * ) Notice: Subject to any disclaimer, the term of this patent is extended or adjusted under 35 U.S.C. 154(b) by 0 days.

(21) Appl. No.: 16/547,161

(22) Filed: Aug. 21, 2019

(65) Prior Publication Data
US 2020/0067814 A1 Feb. 27, 2020

Related U.S. Application Data

(60) Provisional application No. 62/853,418, filed on May 28, 2019, provisional application No. 62/720,653, filed on Aug. 21, 2018.

(51) Int. Cl.
*H04L 12/24* (2006.01)
*H04L 41/0803* (2022.01)
(Continued)

(52) U.S. Cl.
CPC .............. *H04L 45/06* (2013.01); *G06F 1/325* (2013.01); *H04L 45/127* (2013.01); *H04L 45/60* (2013.01)

(58) Field of Classification Search
CPC ....... H04L 45/06; H04L 45/127; H04L 45/60; H04L 49/60; H04L 49/405;
(Continued)

(56) References Cited

U.S. PATENT DOCUMENTS 5,361,363 A * 11/1994 Wells ................ G06F 15/17381
714/E11.011
5,835,710 A * 11/1998 Nagami .............. H04L 12/4608
709/250

(Continued)

OTHER PUBLICATIONS

EZ-Pass: An Energy & Performance-Efficient Power-Gating Router Architecture for Scalable Noes IEEE Computer Architecture Letters, vol. 17, No. 1, Jan.-Jun. 2018 (Year: 2018).*

(Continued)

*Primary Examiner* — Yves Dalencourt
*Assistant Examiner* — Elizabeth Kassa
(74) *Attorney, Agent, or Firm* — Blank Rome LLP (57) ABSTRACT

With the advent of manycore architecture, on-chip interconnect connects a number of cores, caches, memory modules, accelerators, graphic processing unit (GPU) or chiplets in one system. However, on-chip interconnect architecture consumes a significant portion of total parallel computing chip power. Power-gating is an effective technique to reduce power consumption by powering off the routers, but it suffers from a large wake-up latency to resume the full activity of routers. Recent research aims to improve the wake-up latency penalty by hiding it through early wake-up techniques. However, these techniques do not exploit the full advantage of power-gating due to the early wake-up. Consequently, they do not achieve significant power savings. The present invention provides a new router architecture that remedies the large wake-up latency overheads while providing significant power savings. The invention takes advantage of a simple switch to transmit packets without waking up the router. Additionally, the technique hides the wake-up latency by continuing to provide packet transmission during the wake-up phase.

25 Claims, 4 Drawing Sheets

(51) Int. Cl.
*H04L 45/02* (2022.01)
*H04L 45/12* (2022.01)
*H04L 45/60* (2022.01)
*G06F 1/3234* (2019.01)

(58) Field of Classification Search
CPC ... H04L 49/3018; H04L 49/101; G06F 1/325; G06F 1/3209; G06F 1/3287; Y02D 10/00
USPC .......................................................... 709/238
See application file for complete search history.

(56) References Cited

U.S. PATENT DOCUMENTS

| | | | | |
|---|---|---|---|---|
| 6,606,326 | B1* | 8/2003 | Herring | H04L 45/34 370/412 |
| 8,223,650 | B2* | 7/2012 | Kumar | H04L 47/10 370/238 |
| 8,842,687 | B1* | 9/2014 | Jackson | H04L 49/555 370/419 |
| 9,021,130 | B1* | 4/2015 | Sahay | H04L 49/60 709/239 |
| 9,832,030 | B2* | 11/2017 | Basso | H04L 12/18 |
| 2004/0085972 | A1* | 5/2004 | Warren | H04L 47/122 370/401 |
| 2004/0196859 | A1* | 10/2004 | Benner | H04Q 11/0478 370/413 |
| 2008/0186992 | A1* | 8/2008 | Kondapalli | H04L 49/602 370/419 |
| 2009/0138696 | A1* | 5/2009 | Mendel | G06F 1/32 713/320 |
| 2009/0304017 | A1* | 12/2009 | Lee | H04L 45/60 370/412 |
| 2011/0035530 | A1* | 2/2011 | Takagi | H04L 49/25 710/317 |
| 2011/0149729 | A1* | 6/2011 | Benner | H04L 49/3081 370/390 |
| 2011/0199936 | A1* | 8/2011 | Suvakovic | H04J 3/047 370/254 |
| 2011/0314255 | A1* | 12/2011 | Krishna | G06F 15/17337 712/30 |
| 2013/0142066 | A1* | 6/2013 | Yamaguchi | H04L 47/70 370/252 |
| 2013/0235877 | A1* | 9/2013 | Bhardwaj | H04L 45/38 370/401 |
| 2015/0109024 | A1* | 4/2015 | Abdelfattah | H03K 19/017581 326/41 |
| 2015/0163126 | A1* | 6/2015 | Samdanis | H04W 40/005 370/236 |
| 2015/0207638 | A1* | 7/2015 | Basso | H04L 49/101 370/230 |
| 2016/0103715 | A1* | 4/2016 | Sethia | G06F 9/4881 718/106 |
| 2016/0117118 | A1* | 4/2016 | Martínez | G06F 3/0653 711/167 |
| 2016/0344629 | A1* | 11/2016 | Gray | H04L 49/106 |
| 2017/0205863 | A1* | 7/2017 | Lee | G06F 1/3206 |
| 2018/0191523 | A1* | 7/2018 | Shah | H04B 3/36 |
| 2018/0267846 | A1* | 9/2018 | Dobbs | G06F 13/1673 |
| 2019/0102676 | A1* | 4/2019 | Nazari | G06N 3/0472 |
| 2019/0239238 | A1* | 8/2019 | Calabrese | H04W 72/04 |

OTHER PUBLICATIONS

H. Zheng et a., "EZ-Pass: An Energy & Performance-Efficient Power-Gating Router Architecture for Scalable NoCs", IEEE Computer Architecture Letters, vol. 17, No. 1, Jan.-Jun. 2018; pp. 88-91.
K. Wang, et al., "High-Performance, Energy-Efficient, Fault-Tolerant Network-on-Chip Design Using Reinforcement Learning", IEEE, 2019, 6 pgs.
Zheng, el al., "An Energy-Efficient Network-on-Chip Design Using Reinforcement Learning", In Proceedings of the 56th Annual Design Automation Conference, 2019, pp. 1-6.
Chen, et al., "Nord: Node-Router Decoupling for Effective Power-Gating of On-Chip Routers", In Proceedings of IEEE/ACM International Symposium on Microarchitecture. IEEE, 2012, pp. 270-281.
Chen, et al., "Power Punch: Towards Non-Blocking Power-Gating of Noc Routers", In Proceedings of IEEE International Symposium on High Performance Computer Architecture (HPCA), IEEE, 2015, pp. 378-389.
Parikh, et al., "Power-Aware NoCs Through Routing and Topology Reconfiguration", In Proceedings of the 51st Annual Design Automation Conference, 2014, pp. 1-6.

* cited by examiner

EZ-PASS: AN ENERGY PERFORMANCE-EFFICIENT POWER-GATING ROUTER ARCHITECTURE FOR SCALABLE ON-CHIP INTERCONNECT ARCHITECTURE

RELATED APPLICATIONS

This application claims the benefit of U.S. Provisional Application No. 62/720,653, filed Aug. 21, 2018, and U.S. Provisional Application No. 62/853,418, filed May 28, 2019. The entire contents of those applications are incorporated herein by reference.

This application is also related to the paper by H. Zheng and A. Louri, "EZ-Pass: An Energy & Performance-Efficient Power-Gating Router Architecture for Scalable NoCs," IEEE Computer Architecture Letters, vol. 17, No. 1, January-June 2018, and to U.S. application Ser. No. 16/547,297, filed Aug. 21, 2019, based on U.S. Provisional Application No. 62/720,634, filed Aug. 21, 2018, and U.S. Provisional Application No. 62/853,455, filed May 28, 2019. The entire contents of the paper and applications are incorporated herein by reference.

GOVERNMENT LICENSE RIGHTS

This invention was made with Government support under Grant/Contract No. CCF-1547035, CCF-1547036 and CCF-1702980 awarded by National Science Foundation. The U.S. Government has certain rights in this invention.

BACKGROUND OF THE INVENTION

Field of the Invention

The field of invention relates to interconnect architecture for parallel computing chips, and more specifically but not exclusively relates to deployment of power-gating technique on on-chip interconnect architecture in parallel computing chips.

Background of the Related Art

On-chip interconnect architecture connects a large number of nodes in one system, which can be a plurality of cores, caches, memory modules, accelerators, graphic processing unit (GPU) and chiplets in parallel computing chips. However, today, on-chip interconnect consumes a large portion of the entire chip's power budget. The problem will be further exacerbated by the continuous scaling of transistor feature size. This calls for innovative power reduction techniques for future on-chip interconnect design.

Power-gating is an effective technique to reduce power consumption by disconnecting the router from the power supply. However, it suffers from large wake-up latency, which means that the router needs to take a number of cycles to resume its full activity. The intermittent communication between nodes can frequently wake up routers, and thus leading to prohibitive network latency and degraded system performance.

A number of techniques have been proposed to reduce the network latency caused by power-gating. These techniques either wake the router up earlier to hide the wake-up latency or bypass communication traffic to a bypass ring to avoid waking up the router.

SUMMARY OF THE INVENTION

The invention has three primary objects. It is one object of the invention to improve the power saving benefits of the interconnect architectures. It is another object of the invention to mitigate the performance overheads caused by the power-gating. It is a further object of the invention to provide superior scalability that can be applied to any number of nodes and interconnect topologies.

This invention includes a new router design, a new flow control scheme, and a new power-gating control policy. The new router design includes one conventional router and one bypass switch. The conventional router is used to process more intensive communication traffic and consumes more power, while the bypass switch is used to process non-intensive traffic and consumes very little power. The conventional router is with one or more input ports and output ports, a plurality of buffers at each input port, router control logic, and a crossbar. The bypass switch includes one or more input ports and output ports, one or several bypass buffers at each input port, and has a simplified router control logic. The new flow control scheme is with one unified virtual channel state table, which has a plurality of entries. The power-gating control policy includes a controller and a plurality of signals. The controller monitors the traffic of routers, and powers off the router when detecting low volume of the communication traffic. When the power-gating controller powers on/off the router, it sends the signals to its adjacent routers to indicate the power status of its associated router.

A router bypass switch assembly for use with a router in an interconnection architecture having a plurality of nodes connected by a plurality of routers. The assembly includes a router configured to connect a plurality of inputs to a plurality of outputs, and a bypass switch that turns the router OFF to save power when there is a low volume of data activity in the network that can be handled by the bypass switch. The bypass switch includes a switch input coupled between the plurality inputs and the router, and a switch output coupled between the router and the plurality of outputs. The bypass switch bypasses the router to connect the plurality of inputs to the plurality of outputs.

These and other objects of the invention, as well as many of the intended advantages thereof, will become more readily apparent when reference is made to the following description, taken in conjunction with the accompanying drawings.

DETAILED DESCRIPTION OF THE INVENTION

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Figure 1A:
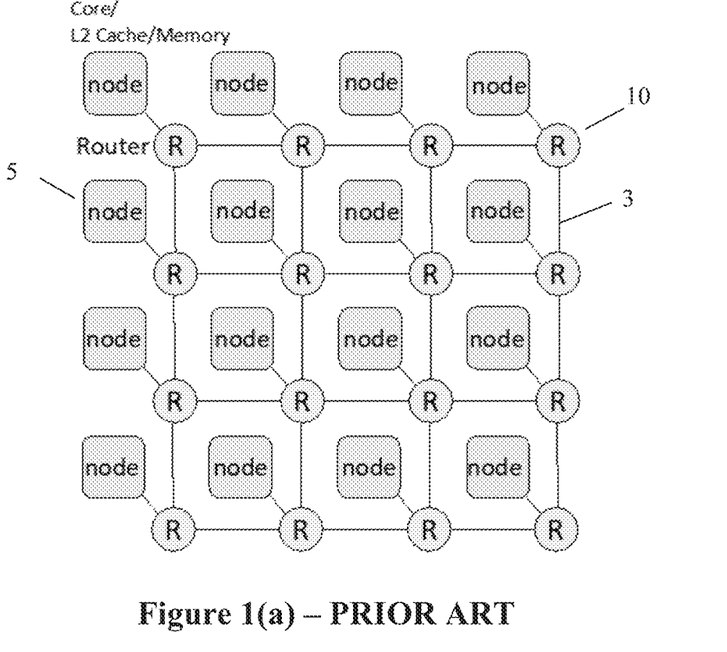
FIG. 1(a) illustrates a conventional mesh interconnect architecture.
Figure 1B:
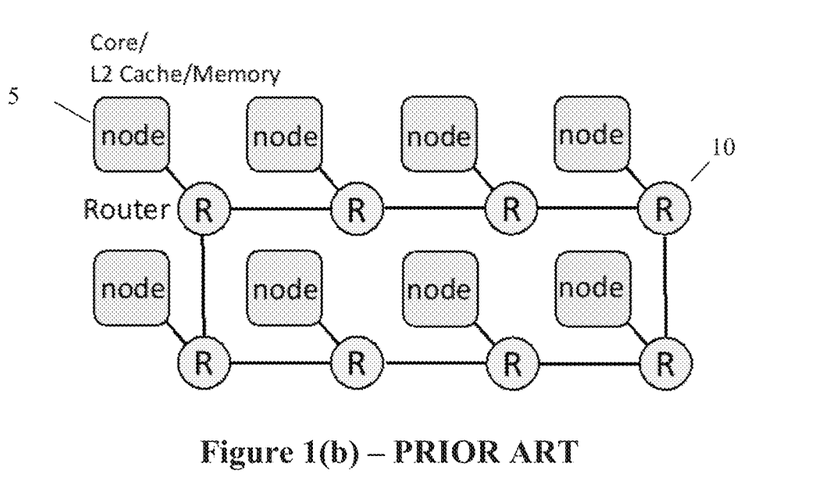
FIG. 1(b) illustrates a conventional ring interconnect architecture.

Turning to the drawings, FIG. 1 shows two conventional example networks in which the present invention can be utilized. In the parallel computing chips, a plurality of nodes 5 are connected to one interconnect architecture. FIG. 1(a) illustrates an example mesh interconnect architecture having a plurality of nodes 5 arranged in rows and columns. A separate router 10 is associated with each respective node 5, so that the routers are arranged in rows and columns. The nodes 5 can be cores, caches, memory modules, accelerators, graphic processing unit (GPU) and chiplets. Each router 10 is connected to and in communication with its neighboring one or more router(s) (here shown as up to four, though more connections can be provided). The router 10 receives data on the communication line 3 and determines whether or not to route all or some of that data to the associated node 5 or neighboring routers 10. The router 10 can also receive data from the node 5 and determine how to transmit that data on the communication line 3. FIG. 1(b) shows an example ring interconnect architecture. Here, the nodes 5 and routers 10 are arranged in a ring configuration, with each router 10 connected to and in communication with two neighboring routers 10. It will be apparent that although mesh and ring networks are shown, the interconnect architecture can be any other interconnect architecture and still be within the spirit and scope of the invention, such as cmesh, clos, torus etc.

Figure 2:
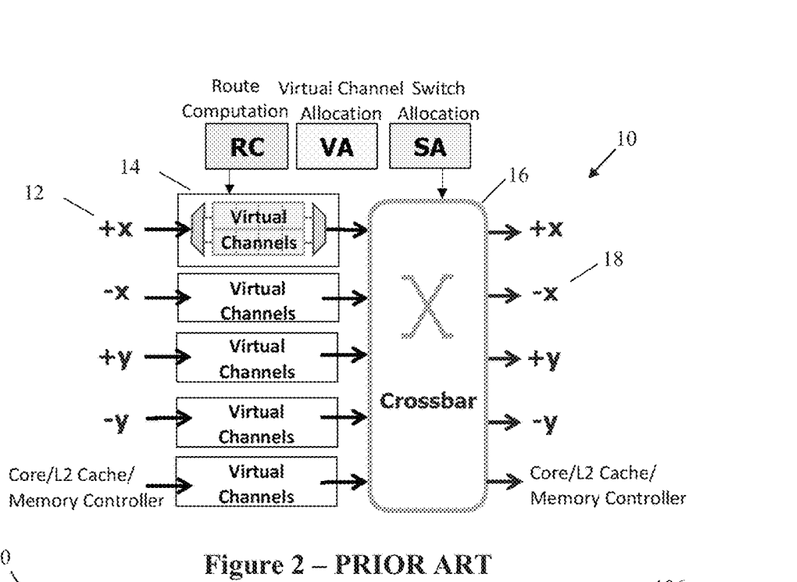
FIG. 2 illustrates an example of conventional router architecture.

FIG. 2 shows an example of a conventional on-chip interconnect router 10 that can be utilized in the networks of either FIG. 1(a) or FIG. 1(b). The router 10 is attached to one or more nodes 5 and other routers 10. The router 10 has a plurality of input ports 12, output ports 18, a crossbar 16, and router control logic. The number of ports 12, 18 can be at least one and more than one, and depends on the selected interconnect architecture.

At each input port 12, there are a plurality of buffers 14 organized as multiple virtual channels (VC) to store the packets. As compared to conventional first in, first out buffer (FIFO), each virtual channel can hold one packet. The organization of virtual channels can remove the constraints of processing the packets in the order they arrive, which avoids the head-of-line blocking problem. As shown, the buffer 14 can include multiple virtual channels, whereby an input buffer multiplexer sends the input 12 to one of the virtual channels, the input data is processed on that virtual channel, and the output is sent to a demultiplexer to provide a single buffer output.

Any packet in the input port 12 can be propagated to its desired output port 18 by the crossbar 16. The number of inputs 12 are shown to be equal to the number of outputs 18, however those need not be equal in number. The crossbar 16 can be any suitable interconnection device that connects one or more inputs at respective input ports to one or more outputs at respective output ports.

The router control logic can comprise, for example, route computation (RC), virtual channel allocation (VA), and switch allocation (SA). The RC, VA, SA are used to avoid the contention between these packets. For example, the RC calculates the output port of each packet. The VA is used to allocate one available virtual channel 14 of downstream routers to all request packets, because simultaneously propagating multiple packets to one buffer can lead to data corruption. The SA is used to assign one output port 18 to one input port at a time to avoid contention in the crossbar 16.

In wormhole routing, a single packet is segmented into a single header flit, several body flits and a single tail flit. The route information of the header flit is read and computed by the control logic (RC, VA and SA) for routing packets. As a result, a flit goes through a conventional router in four stages, namely RC, VA, SA and switch traversing (ST). However, the number of router pipeline stages can be any number, which is not needed to be four stages. Moreover, the information of virtual channels and credits of neighboring routers is written into the Virtual Channel state tables.

Figure 3:
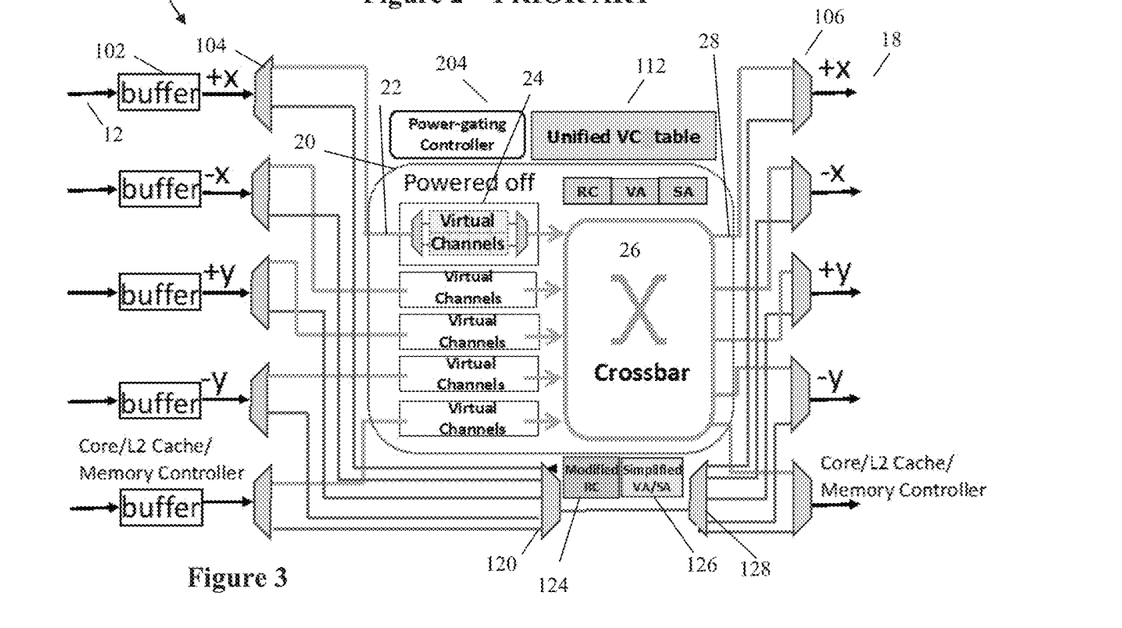
FIG. 3 illustrates embodiment of EZ-PASS router architecture.

FIG. 3 shows a routing assembly or bypass switch 100 in accordance with a non-limiting example embodiment of the invention. The bypass switch 100 has a switch input coupled between the plurality inputs and said router, and a switch output coupled between said router and the plurality of outputs. The bypass switch is configured to bypass said router to connect the plurality of inputs to the plurality of outputs. The switch input has one or more bypass buffers 102, a plurality of input multiplexers 104, and the switch output has a plurality of output demultiplexers 106. The switch also includes a power-gating controller 110, and a plurality of links. The bypass switch 100 connects to one of the routers 20 in a network configuration. The router 20 can be any suitable router, such as the router 10 of FIGS. 1, 2, and having an input 22, buffers 24, crossbar 26, and output 28. The bypass switch 100 also includes a central or switch demultiplexer 120, route computation device or modified RC 124, virtual channel and/or switch allocation device or simplified VA/SA 126, and a central or switch multiplexer 128. At the input end, the input multiplexers 104 are coupled between each input 12 and the router 20. At the output end, the output demultiplexers 106 are coupled between the router 20 and each output 18.

The one or more bypass buffers 102 are used to store the communication packets at each input port 12. A plurality of multiplexers 104, 128, a plurality of demultiplexers 106, 120, and a plurality of links are used to switch the packets to the output port 18 in an unpipelined manner, at minimal power consumption. The bypass switch is controlled by the simplified VA/SA 126, which decides which packet can go through the switch demultiplexer 120. When the power-gating controller 110 detects a number of packets are stored in the buffers 102, it powers ON the router 20. The bypass switch 100 continues to process the flits until the router 20 resumes its full activity.

More specifically, the buffer 102 receives data from a respective input 12, stores that data and transmits it to a respective multiplexer 104. As noted, in one example embodiment, the buffer 102 can only store one or fewer flits and are organized as a FIFO buffer; whereas the conventional VC buffers 24 store a large number of flits. The multiplexer 104 has two output lines. The first multiplexer 104 output is connected to a respective input port of the router 20 and to the respective router buffer 24. The second multiplexer 104 output is connected to the switch demultiplexer 120. Accordingly, the input data 12 received by the switch buffer 102 is transmitted to and received by the router buffer 24 or the switch demultiplexer 120.

The switch demultiplexer 120 has an input connected to each of the input multiplexers 104 and an output connected to the switch multiplexer 128. The switch demultiplexer 120 also receives control signals from the RC 124 and the VA/SA 126, so that the RC 124, VA/SA 126 can control operation of the switch demultiplexer 120. The RC 124 controls the switch demultiplexer 120 and switch multiplexer 128 to switch the packet to one of the output ports 18 of the output demultiplexers 106. The VA/SA 126 decides only one of the inputs 12 to go through the switch demultiplexer 120. In addition, the VA/SA 126 decides which virtual channel the packet will be stored in the downstream router. The VA/SA 126 can provide correct flow control between the bypass switch and downstream routers, such as, for example, the router 10 can communicate with its neighboring routers by using credits, and thus grantee the packets can be properly stored in the downstream routers. The switch multiplexer 128 has a separate output line that connects with a respective output demultiplexer 106, so that the switch multiplexer 128 can transmit the data received from the switch demultiplexer to the selected output demultiplexer 106.

The unified VC state table has of multiple entries, and each entry is composed of information such as input port (Port), virtual channel (VC), read pointer (RP), write pointer (WP), output port (OP), output virtual channel (OVC), credits (CR), stage status (status), and power status of output (s). The information of Port and VC is determined by the incoming data. The rest of information is determined by router 20 or the modified RC 124 and VA/SA 126 of the bypass switch 100.

Each output demultiplexer 106 has a first input from the switch multiplexer 128, and a second input from a respective output port of the router crossbar 26. Thus, the output demultiplexer 106 has as an output 18 either the output from the crossbar 26, or the output from the switch multiplexer 128. The power-gating controller 110 controls operation of the output demultiplexer 106 by setting the control input of demultiplexer, which can selectively set the demultiplexer output. If the router 20 is ON (and the bypass switch 100 OFF), the output demultiplexer 106 connects the router 20 output from the crossbar 26 to the output ports 18. If the bypass switch 100 is ON (and the router 20 is OFF), the output demultiplexer 106 connects the output from the switch multiplexer 128 to the output ports 18. For example, the controller 110 can provide a control input to the demultiplexer 120 and multiplexer 128 that selectively sets the output of the demultiplexer 120 and multiplexer 128.

Before going to the details of the operation of the bypass switch, we will describe how the routers communicate with each other. Since each router only has limited buffer space, it only can receive a certain number of packets from its adjacent routers. For example, let's assume that router 1 and router 2 are connected, and the output +x of router 1 is connected to input +x of router 2. Router 2 only has buffers that can store 2 packets, which indicates that the router 1 cannot send more packets when the input +x of router 2 has two packets. To prevent Router 1 sending additional packets, Router 1 has a virtual state table which records the number of free buffers in the Router 2, which we call credits. When the Router 1 sends one packet to Router 2, its virtual channel state table will decrease the credit number. When the credits are zero, the Router 1 will not send any packets to Router 2. On the other hand, the packets leave the input +x of Router 2, and Router 2 will send a credit back to Router 1 to indicate that Router 2 has a free buffer. In this case, Router 1 can resume sending packets to Router 2.

This explains why the router needs to send notifications to its adjacent routers when switching the router to normal router or bypassing switch. Because the normal router and bypassing switch have a different number of buffers in the input. The bypass switch only has a fewer number of buffers (e.g. 1 buffer), while the normal router has a large number of buffers which are organized as multiple virtual channels (e.g. 20 buffers). Accordingly, the virtual channel state table will set up the correct credit number.

Figure 5:
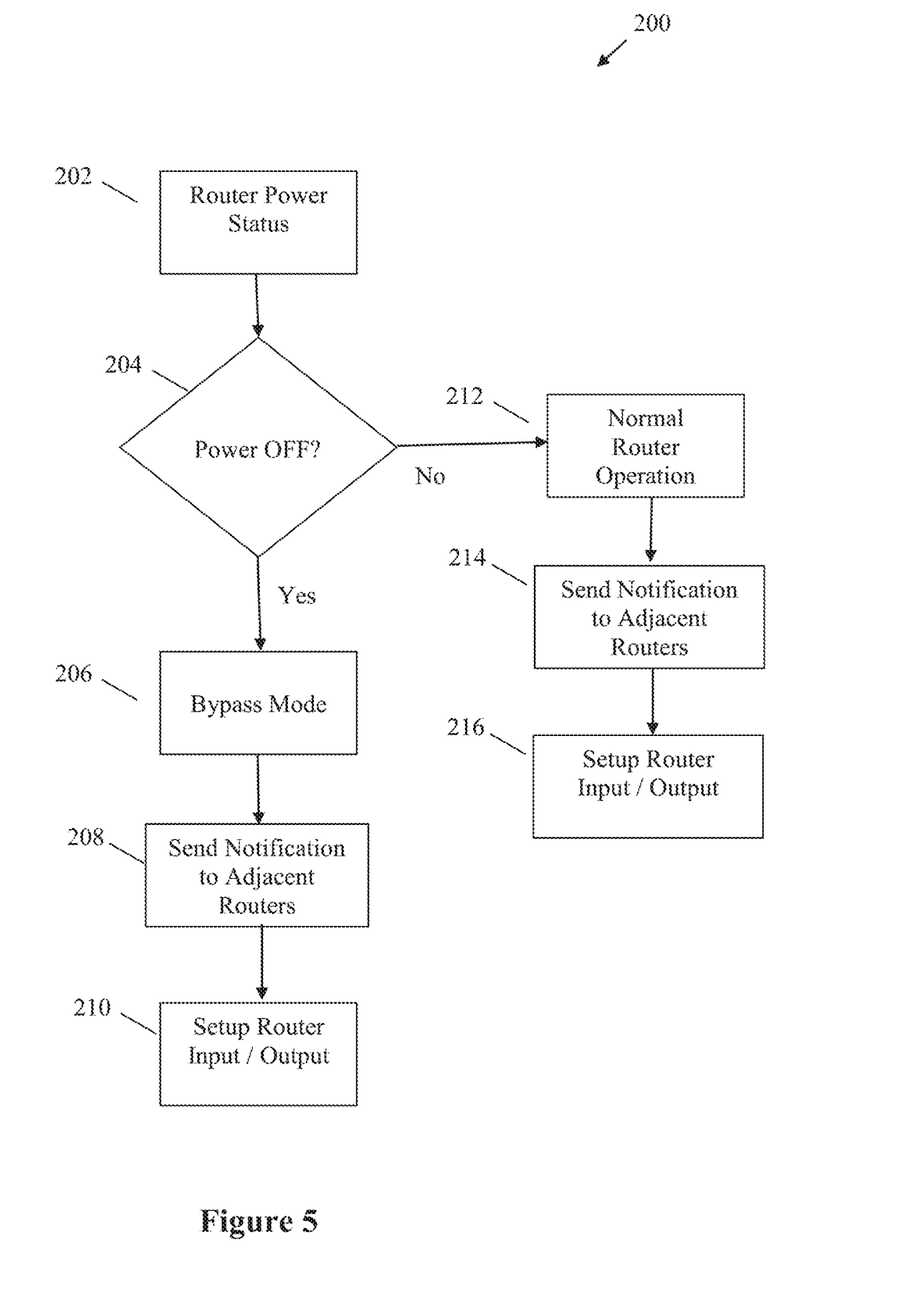
FIG. 5 is a flow diagram showing operation of the invention.

Referring to FIG. 5, the operation 200 of the bypass switch will now be described. At step 202, the power-gating controller 110 decides the power status of router 20, such as ON or OFF. If the router 20 is powered-OFF by the power-gating controller 110, the routing will be switched to the bypass switch 100, step 206. At step 208, when the bypass switch 100 is activated, the power-gating controller 110 sends the notifications to adjacent (i.e., upstream and/or downstream) router assemblies 100, and thus adjacent router assemblies 100 can set up the correct credit number in the virtual channel state table. This confirms the correct communication between routers in different operating modes. In step 210, the bypass switch mode sets up the buffer 102 and multiplexers 104 and 106. In the bypass switch, the data from upstream routers will be stored in the switch buffer 102 instead of the router buffer (virtual channels) 14. The multiplexers 104 and demultiplexers 106 set up the connection between the input 12 and the bypass switch demultiplexer 120, and connection between the bypass switch demultiplexer 120 and the output 18.

Here, the modified RC 124 and Simplified VA/SA 126 control the operation of switch multiplexer 120 and demultiplexer 126. The modified Route Computation 124 computes the output port 18 of the packet, and computes and assigns the virtual channel information of the packet. The VC information will decide which VC the packet will be stored in the next (i.e., downstream) router. The packet with assigned VC sends the request to the simplified VA/SA 126. The simplified VA/SA 126 selects the data of input buffer 102 that wins the bypass switch 120. The selected data will be transmitted from the switch demultiplexer 120 to the switch multiplexer 128. Once the selected data is transmitted to the output 18, the unified virtual channel state table will decrease the credit number of the associated output 18.

The Switch Traversing (ST) selects which output demultiplexer 106 is to receive the flit from the multiplexer 128 to form the output 18 for the switch 100. For example, the RC 124 determines the desired output port 18 of the packet from amongst the plurality of outputs 18, and assigns any available VC from the unified VC state table 112 to the packet. The simplified VA/SA 126 allocates the bypass switch and VC to one of the request packets. The packets that lost the arbitration will be assigned with a new VC. At step 210, the output demultiplexer 106 provides the output from either the router crossbar 26 or the switch multiplexer 128 as the output 18 of the switch 100.

The unified VC state table 112 records the VC information and credit number of all input ports, and provides correct flow control between routers 10 and bypass switches 100. The unified VC state table 112 can be accessed by both the router 20 and by the bypass switch 100. FIG. 4(b) shows the router (FIG. 3) buffers 24 in further detail communicating with the VC state table 112. As illustrated, the virtual channel state table 112 is associated with all input ports 12. The table 112 includes the information of VC number and credit number (CR), as well as other information such as input port (Port), virtual channel (VC), read pointer (RP), write pointer (WP), output port (OP), output virtual channel (OVC), credits (CR), stage status (status), and power status of output (S). The information of Port and VC is determined by the incoming data. The rest of information is determined by router 20 or the modified RC 124 and VA/SA 126 of the bypass switch. For example, the OP is decided by the RC, and the OVC is determined by VA/SA.

Figure 4A:
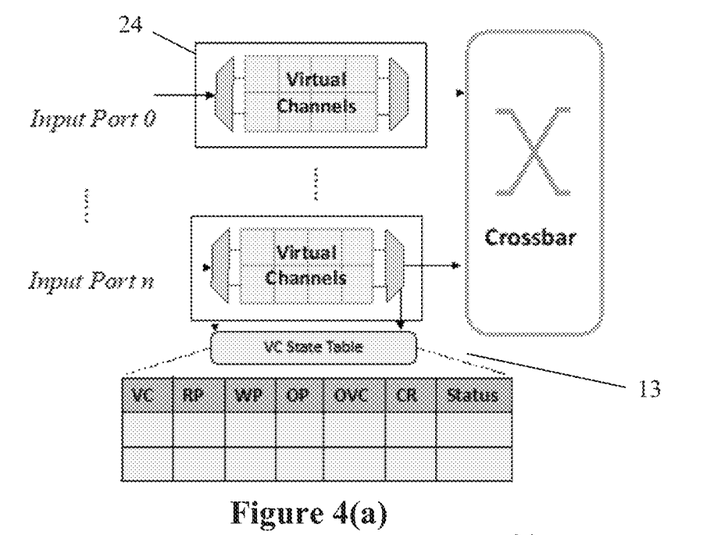
FIG. 4(a) illustrates the unified virtual channel state table communicating with the router.
Figure 4B:
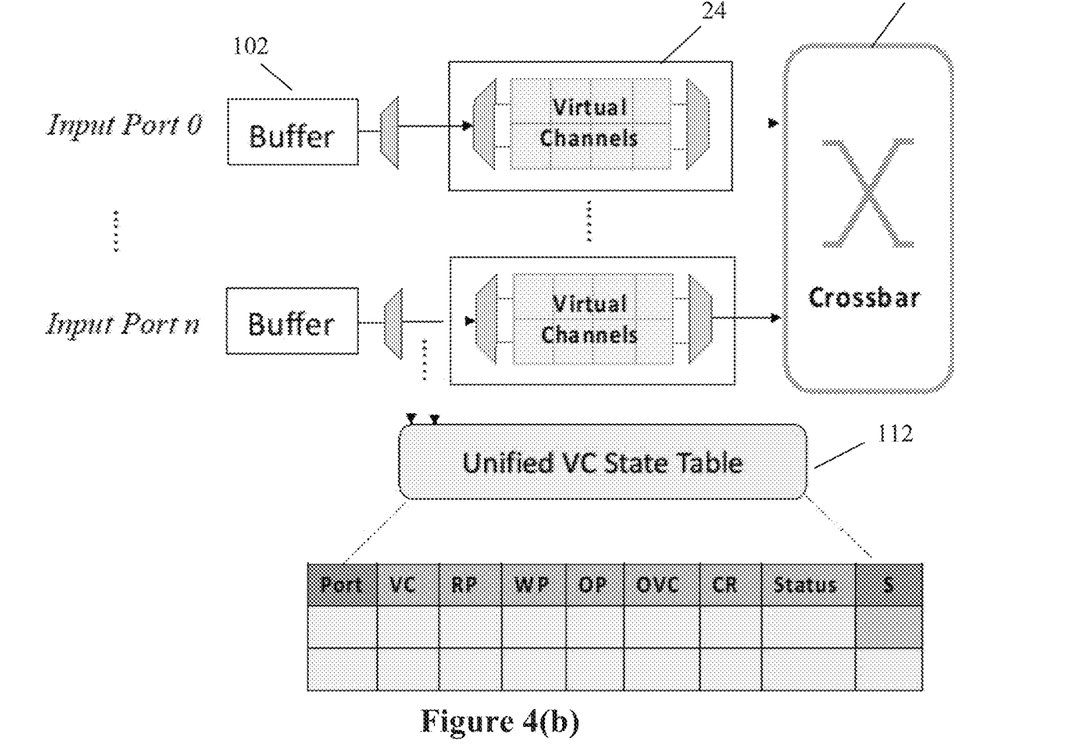
FIG. 4(b) illustrates the unified virtual channel state table communicating with the bypass switch.

Since the individual VC tables 13 (FIG. 4(a)) are part of the router 10, they can only be accessed when the router 10 is powered ON. Once the power-gating controller 110 of the bypass switch 100 powers OFF the router 20, each virtual channel state table 13 can no longer be accessed by the bypass switch 100. To always have access to the information contained in the virtual channel state tables 13, all of the information contained in all of the virtual channel tables 13 are unified into a master unified state table 112, as shown in FIGS. 3, 4(b), and provided with an independent power supply.

That can be done, for example, by replacing the conventional router table 13, FIG. 4(a), with the unified table 112, as shown in FIG. 4(b). Two additional data entries are stored in the unified VC state table 112, namely input port number (Port) and downstream router status (S). The input port number indicates the input port 12 associated with the incoming packet, and therefore the router 20 and bypass switch (e.g., switch demultiplexer 120 and switch multiplexer 128) can sufficiently identify the routing information. The router status S indicates the power status of a downstream router. The power status can make the router aware of the number of buffers and how these buffers organized in the downstream routers and set the credit and VC information accordingly. The current router 20 can record the credit number (e.g. VC and buffers) of its downstream router in the unified table 112. Thus, the router 20 (FIG. 4(b)) has one unified virtual channel state table, which is shared by all virtual channels 14 and buffers 102, whereas the router 10 (FIG. 4(a)) has nonunified virtual channel state tables, which are associated with virtual channels 14 of each input 12.

Returning to step 204, in the router operational mode, the router 20 is switched ON and operates as normal for high traffic conditions. Thus, the router 20 receives the input data 12 from the multiplexer 104 and processes the data as normal, step 212. The router 20 output from the crossbar 26 is fed into the demultiplexer 106 and forms the output 18 of the switch 100. The bypass switch 100 (i.e., switch demultiplexer 120 and multiplexer 128, as well as the RC 124 and VA/SA 126) is turned OFF to reduce power consumption.

Accordingly, at step 206, the bypass switch 100 will either power ON the router 20 for high traffic conditions or bypass the router 20 so the switch 100 can handle sporadic and/or low traffic conditions. The sporadic traffic is often defined as when the throughput of the routers is lower than 0.25 flits/cycle, and low traffic can be defined as 0.5 flits/cycle, though any suitable threshold levels can be set. When the router 20 is powered ON, switching is performed by the router 20 and not the bypass switch 100. This will occur when there is a sufficient amount of data to be processed that exceeds the capacity of the bypass switch 100. The capacity of the bypass switch 100 can be from 0.5 flits/cycle to 1 flits/cycle, though can be more or less, depending on system requirements. Specifically, if the system requires more energy savings, we can set the capacity of the bypass switch 100 more than iflits/cycle. However, when the data activity is low and can be handled by the bypass switch 100, the switch 100 turns OFF the router 20 and switching is performed by the switch 100.

Aside from reducing power consumption, another benefit of the bypass switch 100 is the reduced latency of the switch 100 over the router 20. The router 20 has a large number of virtual channels 14 at each input port 12, resulting in complicated VA and SA arbiters, which accounts for a significant amount of the router delay. Since the bypass switch 100 has a reduced number of FIFO buffers 102 at the input port 12, the complexity of the VA and SA 126 is significantly reduced, hence reducing the router critical delays.

In a conventional router, more virtual channels can provide larger router throughput, but the large number of virtual channels consumes prohibitive power consumption. In the proposed bypass switch 100, the buffer 102 is organized as FIFO and only has one to three buffers, which reduces the storage at input 12 but simplifies the router critical delay (e.g. VA/SA). In other words, the bypass switch 100 consumes less power and provides a faster speed to process the packets from the input ports 12 to the output ports 18, as compared to a conventional router 10. The reduced critical delay is achieved, for example, by the modified pipeline stages, specifically the modified RC 124, the simplified VA and SA 126, and Switch Traversing (ST).

In yet another illustrative example embodiment of the invention, the power-gating controller 110 powers on/off the router 20 according to the traffic volume. For example, when the traffic is low, the bypass switch is turned on and router 20 is powered off. However, the on-chip communication is often unpredictable, which can lead to inaccurate power on/off activities. To improve the control accuracy, we introduce the reinforcement learning to automate a control policy, which can decide when to power on/off the router instead of a pre-set threshold (e.g. router throughput). The pre-set threshold is based on observing the router throughput such as 0.5 flits/cycles. The automated control policy is based on observing more system parameters in addition to router throughput, such as cache activities and router buffer utilization. We specify the proposed reinforcement learning model for automating the control policy.

The reinforcement learning has state, action and reward. The state is the system parameters the reinforcement learning observes. For example, the reinforcement learning monitors a number of system parameters, such as cache activities, router throughput, and router buffer utilization rate. The action is the router operation mode such as normal router 20 and bypass switch 100. The reward is the product of average cache miss latency in miss standing holding register (MSHR) and router power, as shown in the following equation.

$$\text{Reward} = \text{Latency}_{MSHR} \times \text{Power}_{router}$$

Where the latency$_{mshr}$ is the average cache miss latency in miss standing holding register (MSHR), power$_{router}$ is the power of router. The latency$_{mshr}$ can represent the system performance, while power$_{router}$ can represent the power consumption of the on-chip interconnect.

The proposed reinforcement learning model is trained offline. In the training, the reinforcement learning iteratively selects the router operation mode (e.g. normal router 20 or bypass switch 100) over a number of time epochs. In each time epoch, the reinforcement learning selects one router operation mode and records the current system parameters as a state. In the next time epoch, the reinforcement learning calculates the reward for the operation mode selected in the previous time epoch and updates the calculated reward to a table called Q-table. In the Q-table, the state and reward are mapped to one entry. In doing so, the recorded information (e.g. state and reward) can be read and updated by the following iterations. In the following iterations, the reinforcement learning iteratively selects the router operation mode that has the highest reward, and eventually automates a table that can instruct the router to select the operation mode with highest reward.

The automated Q-table is called an automated control policy, which is similar to a pre-set threshold. We can use the automated control policy instead of a pre-set threshold. In the pre-set threshold control policy, the power-gating controller 110 detects the communication traffic and decides the router operation mode (e.g. normal router 20 or bypass switch 100). When the detected traffic is higher than the threshold (e.g. 1 flit/cycle), the power-gating controller selects the normal router 20. Otherwise, the bypass switch 100 is selected.

In the automated control policy, the power-gating controller 110 detects the cache activities, router throughput, and router buffer utilization rate. Then the power-gating controller 110 searches the control policy with detected parameters. It finds out which operation mode has the highest the reward in the detected parameters. The operation mode with highest reward will be selected for the next time epoch.

The system and method of the present invention include operation by one or more processing devices, including operating of the power-gating controller 110, modified RC 124, simplified VA/SA 126, as well as the router RC, VA, SA. The processing device can be any suitable device, such as a computer, server, mainframe, processor, microprocessor, PC, tablet, smartphone, or the like. The processing devices can be used in combination with other suitable components, such as a display device (monitor, LED screen, digital screen, etc.), input device (touchscreen, keyboard, pointing device such as a mouse), wireless module (RF, Bluetooth, infrared, WiFi, etc.).

Information and data can be stored in a memory, such as the unified VC table 112. The entire process is conducted automatically by the processing device, and without any manual interaction. Accordingly, unless indicated otherwise the process can occur substantially in real-time without any delays or manual action. Embodiments may include non-volatile secondary storage, read-only memory (ROM), and/or random-access memory (RAM).

It is noted that the invention has been illustrated with the bypass switch 100 shown in FIG. 3 and described as being external to the router 10. That is, all of the bypass switch 100 elements—including the input multiplexer 104, switch demultiplexer 120, modified RC 124, simplified VA/SA 126, switch multiplexer 128, output demultiplexer 106, controller 110 and unified VC table 112—are outside of the router 20. The router 20 and bypass switch 100 can each have its own housing and be separate and discrete elements.

However, one or more of those switching elements can be provided inside the router 10 or otherwise integral to the router 10. For example, the router 10 and switch 100 can be provided together in a single housing and operate seamlessly as a routing device or routing assembly that replaces a standard router 10. Or, certain operations of the bypass switch 100 and/or router 10 can be shared. For example, the router 10 can utilize the switching of the switch 100 during operation of the router 10. Or, the bypass switch 100 need not have its own RC 124 and VA/SA 126, but instead can power ON the respective RC, VA, SA of the router 10 only.

Moreover, it is noted that only a single bypass switch 100 is shown. However, more than one bypass switch can be provided, each having the same or different data processing capacities. Or, a single bypass switch can be utilized with more than one router 10.

Still further, it is noted that the controller 110, VC table 112, RC 124, VA/SA 126 are all shown and described as separate modules or device. However, the operation of those elements can all be performed by a single processing device or controller, such as controller 110. And the data stored in the table 112 can be at a separate device or at the controller.

Thus, the foregoing description and drawings should be considered as illustrative only of the principles of the invention. The invention may be configured in a variety of ways and is not intended to be limited by the embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A router assembly comprising:
   a router configured to connect a plurality of inputs to a plurality of outputs; and
   a bypass switch having a switch input coupled between the plurality of input links and said router's input ports, a switch output coupled between said router's output ports and the plurality of output links, a demultiplexer coupled to the switch input port, and a switch multiplexer coupled to the demultiplexer and the switch output port, wherein said bypass switch is configured to, in response to the router being off, bypass said router to connect the plurality of inputs to the plurality of outputs via the switch demultiplexer and the switch multiplexer of said bypass switch,
   wherein said bypass switch is configured to, in response to the router being off, direct packets/flits from any of a plurality of adjacent upstream routers connected to the plurality of inputs to any of a plurality of adjacent downstream routers connected to the plurality of outputs in a non-pipelined manner.

2. The router assembly of claim 1, said router assembly connected to one or more nodes.

3. The router assembly of claim 2, wherein said nodes comprise adjacent routers, cores, caches, memory modules, accelerators, graphic processing unit (GPU) or chiplets.

4. The router assembly of claim 3, wherein said memory modules comprise static random access memory (SRAM), dynamic random access memory (DRAM), or Non-volatile random access memory (NVRAM).

5. The router assembly of claim 1, wherein said bypass switch further comprises:
   a plurality of first-in-first-out input buffers arranged to receive packets/flits from upstream routers, when the router being off, each connected to one of the plurality of inputs; and
   a plurality of input multiplexers, each connected to one of said plurality of input buffers and having a first input multiplexer output connected to one of the plurality of router inputs and a second input multiplexer output;
   wherein:
   the switch demultiplexer is configured to receive the second input multiplexer output from each of said plurality of input multiplexers and have a single switch demultiplexer output;
   the switch multiplexer is configured to receive the single switch demultiplexer output from said switch demultiplexer and provide a switch multiplexer output on one of a plurality of switch multiplexer outputs; and
   said bypass switch further comprises a plurality of output demultiplexers each connected to a respective one of the plurality of switch multiplexer outputs and having a first input connected to the switch multiplexer output and a second input connected to one of the plurality of router outputs.

6. The router assembly of claim 5, further comprising a processing device selecting one of the second input multiplexer output from each of said plurality of input multiplexers as the single switch demultiplexer output, during the router is powered off.

7. The router assembly of claim 5, further comprising a processing device selecting one of the plurality of switch multiplexer output to provide the switch multiplexer output, one of which have the access to the switch at a time.

8. The router assembly of claim 1, further comprising a processing device that disconnects said router from power or turns said router OFF and connects the said switch to power or turns said switch ON, vice versa.

9. The router assembly of claim 1, said router assembly configured in an interconnect architecture.

10. The router assembly of claim 9, wherein said interconnect architecture comprises regular topologies such as 2D mesh, 3D mesh, torus, cmesh, ring, or heterogenous topologies.

11. The router assembly of claim 1, further comprising an arbiter that simultaneously allocates switch and credit to one packet/flit to avoid contentions.

12. The router assembly of claim 1, further comprising a unified virtual channel state table that records the routing information of packets/flits stored at all input ports, the unified virtual channel is accessible to both the said router and the said bypass switch at all the time.

13. The router assembly of claim 12, said virtual channel state table further having the credit and virtual channel information of downstream routers, port information, and power status of its adjacent routers.

14. The router assembly of claim 12, said virtual channel state table further having downstream router status information.

15. The router assembly of claim 1, further comprising a control policy that determines the active and powered-OFF state of said router and said bypass switch.

16. The router assembly of claim 15, wherein the router is powered-OFF when traffic to the router is below a threshold and powered-ON when traffic is above a threshold.

17. The router assembly of claim 16, wherein the threshold is 1 flit/cycle or could be tuned in accordance with different applications.

18. The router assembly of claim 16, the threshold is a threshold of control policy that can be automated by reinforcement learning.

19. The router assembly of claim 18, a state space that is system parameters collected as inputs of the reinforcement learning includes cache misses, router throughput, and router buffer utilization rate targeting the power management for on-chip interconnects, all of which are profiled at runtime, wherein the reinforcement learning algorithm is implemented in the hardware consisting of buffers and related computation logics.

20. The router assembly of claim 18, wherein a reward function of reinforcement learning includes an average cache miss latency in miss standing holding register (MSHR) and router power.

21. The router assembly of claim 20, wherein the control policy is based on cache misses, router throughput, router buffer utilization rate, and the reward function is a product of average cache miss latency in miss standing holding register (MSHR) and router power.

22. The router assembly of claim 20, wherein the router power comprises static power or dynamic power of a router.

23. A router assembly comprising:
a router configured to connect a plurality of inputs to a plurality of outputs; and
a bypass switch having a switch input coupled between the plurality of inputs and said router, a switch output coupled between said router and the plurality of outputs, a switch demultiplexer coupled to the switch input, and a switch multiplexer coupled to the switch demultiplexer and the switch output, wherein said bypass switch is configured to, in response to the router being off, bypass said router to connect the plurality of inputs to the plurality of outputs via the switch demultiplexer and the switch multiplexer of said bypass switch,
wherein the bypass switch is configured to determine a desired output among the plurality of outputs and for transmitting a communication packet from an input of the plurality of inputs, and
wherein said bypass switch is configured to, in response to the router being off, direct packets from any of a plurality of adjacent upstream routers connected to the plurality of inputs to any of a plurality of adjacent downstream routers connected to the plurality of outputs.

24. The router assembly of claim 23, wherein the bypass switch further includes:
one or more first-in-first-out bypass buffers configured to store communication packets/flits at each of the plurality of inputs of the said router.

25. The router assembly of claim 23, wherein the bypass switch further includes:
a route computation (RC), coupled with the multiplexer logic of bypass switch, configured to determine the desired output among the plurality of outputs for the bypass switch during the router being off; and
a virtual-channel-allocation-and-switch-allocation (VA-SA) device, where the desired port selection is performed and one of available virtual channels is allocated, configured to decide the communication packet/flit that goes through the switch demultiplexer during the router being off, wherein the VA-SA device is coupled with switch demultiplexer logic which is one clock cycle time.

* * * * *